United States Patent
Allam et al.

(10) Patent No.: US 8,296,725 B2
(45) Date of Patent: Oct. 23, 2012

(54) FRAMEWORK FOR VARIATION ORIENTED ANALYSIS FOR SERVICE-ORIENTED ARCHITECTURE

(75) Inventors: Abdul Allam, Raleigh, NC (US); Douglas Eugene Darbyshire, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 12/410,491

(22) Filed: Mar. 25, 2009

(65) Prior Publication Data
US 2010/0251207 A1   Sep. 30, 2010

(51) Int. Cl.
G06F 9/44       (2006.01)
G06F 9/45       (2006.01)

(52) U.S. Cl. .................. 717/104; 717/106; 717/136
(58) Field of Classification Search .................. None
See application file for complete search history.

(56) References Cited

U.S. PATENT DOCUMENTS

| | | | |
|---|---|---|---|
| 7,761,844 B2* | 7/2010 | Bove et al. | 717/136 |
| 7,979,840 B2* | 7/2011 | Zhang et al. | 717/104 |
| 8,195,803 B2* | 6/2012 | Zhang et al. | 717/104 |
| 2005/0210455 A1* | 9/2005 | Koehler et al. | 717/136 |
| 2007/0022410 A1* | 1/2007 | Ban et al. | 717/136 |
| 2007/0028208 A1* | 2/2007 | Maki | 717/106 |
| 2008/0091448 A1 | 4/2008 | Niheu et al. | |
| 2008/0127047 A1* | 5/2008 | Zhang et al. | 717/104 |
| 2008/0155537 A1 | 6/2008 | Dinda et al. | |
| 2008/0163164 A1* | 7/2008 | Chowdhary et al. | 717/106 |
| 2008/0178146 A1* | 7/2008 | Koehler et al. | 717/106 |
| 2008/0240119 A1 | 10/2008 | Wylie et al. | |
| 2008/0263194 A1 | 10/2008 | Choi et al. | |
| 2008/0270475 A1 | 10/2008 | Delvat | |
| 2009/0150860 A1* | 6/2009 | Gschwind et al. | 717/104 |
| 2009/0158240 A1* | 6/2009 | Zhang et al. | 717/104 |
| 2010/0077386 A1* | 3/2010 | Akkiraju et al. | 717/136 |
| 2010/0107135 A1* | 4/2010 | Arsanjani et al. | 717/104 |
| 2011/0004862 A1* | 1/2011 | Kejriwal et al. | 717/106 |
| 2011/0219354 A1* | 9/2011 | Zhang et al. | 717/104 |

OTHER PUBLICATIONS

Ali Arsanjani, "Service-oriented modeling and architecture", Nov. 9, 2004, IBM, pp. 1-10. <http://www.ibm.com/developerworks/library/ws-soa-design1/>.*

(Continued)

*Primary Examiner* — Thuy Dao
*Assistant Examiner* — Ben Wang
(74) *Attorney, Agent, or Firm* — Patrick J. Daugherty; Driggs, Hogg, Daugherty & Del Zoppo Co., LPA (57) ABSTRACT

Methods, including service methods, articles of manufacture, systems, articles and programmable devices are provided for performing variation oriented analysis across aspects of service oriented architecture modeling. A commonality or variance of a first process to a second process of an initial model plurality of processes is captured, each having an initial model process format, and also of a third process relative to a fourth process of another model plurality of processes having a different format, wherein the commonalities and variances are stored in a common repository memory device in a repository format different from the model process formats. Processes of a model plurality are then refined as a function of the stored commonalities and variances, wherein refining comprises considering any of the stored commonalities and variances.

20 Claims, 4 Drawing Sheets

OTHER PUBLICATIONS

Zhang et al., "Variation-Oriented Analysis for SOA Solution Design", 2007 IEEE, SCC 2007, pp. 1-9. <http://ieeexplore.ieee.org/stamp/stamp.jsp?arnumber=04278704>.*

Arsanjani et al., "SOMA: A Method for developing service-oriented solutions", IBM Systems Journal, vol. 47, No. 3, 2008, pp. 377-396. <http://www.cs.jyu.fi/el/tjtse54_09/Artikkelit/ArsanjaniEtAlIBMSsJ.pdf>.*

Nguyen et al., "Managing Service Variability: State of the Art and Open Issues", 2011 ACM, VaMoS'11, pp. 165-173. <http://delivery.acm.org/10.1145/1950000/1944913/p165-nguyen.pdf>.*

Li et al., "Research on Reasoning of the Dynamic Semantic Web Services Composition", 2006 IEEE, pp. 1-7; <http://ieeexplore.ieee.org/xpl/articleDetails.jsp?arnumber=4061408>.*

Luba Cherbakov, "Service-Oriented Modeling and Architecture", OMG SOA/WS/MDA workshop, Orlando, FL, Mar. 21-24, 2005, pp. 1-24; <http://www.omg.org/news/meetings/workshops/MDA-SOA-WS_Manual/03-1_Cherbakov.pdf>.*

Sun et al., "A Model Transformation Method in Service-oriented Domain Modeling", 2010 IEEE, pp. 107-116; <http://ieeexplore.ieee.org/stamp/stamp.jsp?tp=&arnumber=5475067>.*

* cited by examiner

FIG 5

# FRAMEWORK FOR VARIATION ORIENTED ANALYSIS FOR SERVICE-ORIENTED ARCHITECTURE

FIELD OF THE INVENTION

The present invention generally describes frameworks for performing variation oriented analysis across aspects of modeling in a service-oriented architecture.

BACKGROUND OF THE INVENTION

A Service-Oriented Architecture (SOA) environment is a business-centric information technology (IT) architectural approach that supports integrating linked and repeatable business tasks or services. Services may be designed and created leveraging functionality and capability from across applications which can be from the same or different business domains. One objective of SOA is flexibility and agility in business processes and the underlying supporting IT capabilities, which may require the identification and support of variations of one process relative to another, and further to provide a common view of various artifacts produced during an analysis and decomposition.

SOA analysis generally includes modeling of a plurality of SOA artifacts through respective modeling tools. Problems arise in attempting to provide a common view across each model. For example, in the prior art such attempts are done retroactively, capturing only hardened assets. In addition, existing techniques also tend to focus on governance aspects of these hardened assets only.

SUMMARY OF THE INVENTION

Methods are provided for performing variation oriented analysis across aspects of service oriented architecture modeling. A commonality or variance of a first process to a second process of an initial model plurality of processes is captured, each of the initial model processes having an initial model process format, the commonality or variance stored in a common repository memory device in a repository format different from the initial model process format. Further, a commonality or variance of a third process relative to a fourth process of another model plurality of processes is also captured, the third and fourth processes having an another model process format different from the initial model process format and the repository format, said third-fourth process commonality or variance stored in the common repository memory device in the repository format. At least two processes of the initial model plurality processes are then refined into a refined initial model plurality process as a function of at least one of the stored commonalities and variances, wherein the refining comprises considering any of the stored commonalities and variances.

Service methods are also provided, in some embodiments by a service provider offering to implement, deploy, and/or perform functions for others. In one example, a service provider deploys a computational device infrastructure for performing variation oriented analysis across aspects of service oriented architecture modeling according to the method steps described above during a service-oriented architecture analysis phase. Still further, articles of manufacture comprising a computer usable medium having a computer readable program in said medium are provided. Such program code comprises instructions which, when executed on a computer system, cause the computer system to perform one or more method and/or process elements described above for performing variation oriented analysis across aspects of service oriented architecture modeling. Moreover, systems, articles and programmable devices are also provided, configured for performing one or more method and/or process elements of the current invention for performing variation oriented analysis across aspects of service oriented architecture modeling, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description; and
II. Computerized Implementation.

I. General Description

Examples of SOA aspects and governance processes according to the present invention may be found in the following commonly-owned and co-pending U.S. patent applications or issued U.S. patents, the disclosures of which are expressly incorporated herein by reference: "Identifying a Service Oriented Architecture Shared Services Project", filed on Nov. 24, 2008, and assigned application Ser. No. 12/277,280; "Evaluating a Service Oriented Architecture Shared Services Project", filed on Feb. 19, 2009, and assigned application Ser. No. 12/388,533; "Selecting a Service Oriented Architecture Shared Service", Feb. 24, 2009, and assigned application Ser. No. 12/391,426; "Service Oriented Architecture Shared Services Elaboration", filed on Feb. 24, 2009, and assigned application Ser. No. 12/391,728; "Service Oriented Architecture Shared Services Construction", filed on Feb. 25, 2009, and assigned application Ser. No. 12/392,189; "Transitioning to Management of a Service Oriented Architecture Shared Service", filed on Feb. 25, 2009, and assigned application Ser. No. 12/391,728; "Management of a Service Oriented Architecture Shared Service", filed on Feb. 26, 2009, and assigned application Ser. No. 12/393,110; "Service Oriented Architecture Shared Service Escalation", filed on Feb. 24, 2009, and was assigned application Ser. No. 12/391,362; "SOA POLICY VERSIONING", filed on Mar. 25, 2009, and assigned application Ser. No. 12/410,488; "TECHNICAL FEASIBILITY EXPLORATION FOR SERVICE-ORIENTED ARCHITECTURE ENVIRONMENTS", filed on Mar. 25, 2009, and assigned application Ser. No. 12/410,493; "SOA LIFECYCLE GOVERNANCE AND MANAGEMENT", filed on Mar. 25, 2009, and assigned application Ser. No. 12/410,497; "ENABLING SOA GOVERNANCE USING A SERVICE LIFECYCLE APPROACH", filed on Mar. 25, 2009, and assigned application Ser. No. 12/410,503; "CALIBRATION FRAMEWORK FOR EFFORT ESTIMATION", filed on Mar. 25, 2009, and assigned application Ser. No. 12/410,509; "SERVICE PORTFOLIO APPROACH FOR SOA GOVERNANCE", filed on Mar. 25, 2009, and assigned application Ser. No. 12/410,526; "SERVICE EVOLUTION APPROACH IN SOA", filed on Mar. 25, 2009, and assigned application Ser. No. 12/410,541; "CAPABILITY AND MATURITY-BASED SOA GOVERNANCE", filed on Mar. 25, 2009, and assigned application Ser. No. 12/410,554; "PRIORITIZATION ENABLEMENT FOR SOA GOVERNANCE", filed on Mar. 25, 2009, and assigned application Ser. No. 12/410,572; and "SOA POLICY ENGINE FRAMEWORK", filed on Mar. 25, 2009, and assigned application Ser. No. 12/410,592.

Figure 1:
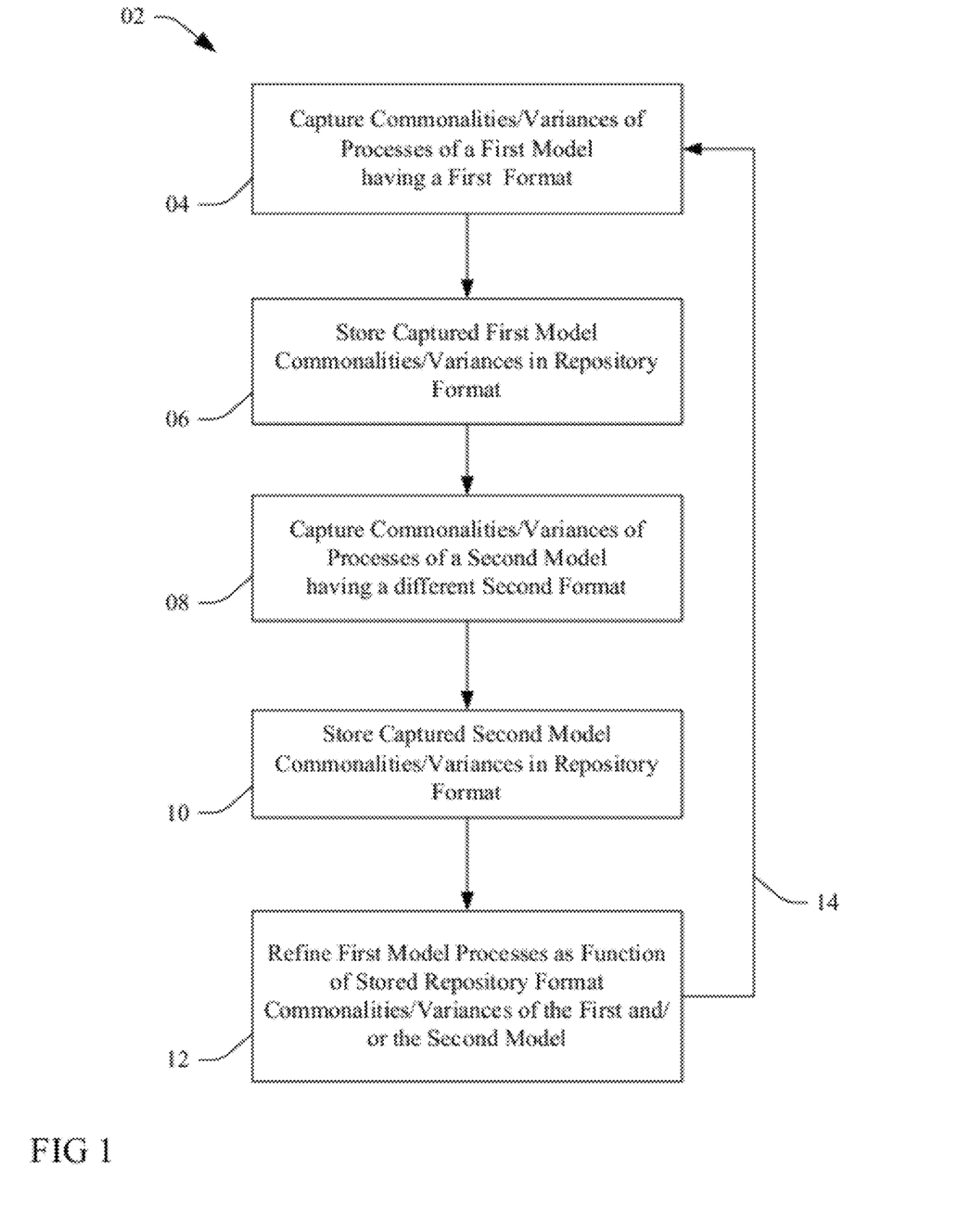
FIG. 1 is a flow chart of a framework for performing variation oriented analysis across aspects of SOA modeling according to the present invention.

FIG. 1 is a flow chart of a framework 02 for performing variation oriented analysis across aspects of SOA modeling according to the present invention. At 04 a plurality of processes of an initial or first SOA artifact or process model are considered or analyzed and one or more commonalities and variances of some of the processes of the model are captured. Generally, the initial model processes share a common or complementary format appropriate to the particular model. According to the present invention at 06 the captured commonalities and variances are translated, converted or otherwise stored in a different repository format.

At 08 a plurality of processes of another different SOA artifact or process model are considered or analyzed and one or more commonalities and variances of the another model processes are captured, the another-model processes generally sharing a common or complementary format appropriate to that particular model and also different from both the initial given model process format and the repository format. At 10 the captured commonalities and variances of the second another-model model are translated, converted or otherwise stored in the repository format.

At 12 two or more of the initial model plurality processes are refined into an initial model plurality process, the refining a function of the stored repository format commonalities and variances of either or both of the initial-model and another-model processes. More particularly, refining at 12 is configured to, or otherwise enabled to, consider all commonalities and variances stored in the repository format, and thus to consider multiple and divergent model processes otherwise described by different and non-complementary formats (including the present initial-model and another-model processes) in order to refine processes in any one model. Thus, in one example, two initial-model processes may be decomposed into a new decomposed process as a result of considering commonalities and variances of the different second another-model as converted/translated/etc. and stored in the repository format. Process feedback at 14 from the refining at 12 may also provide one or more new models or other feedback data to process models (or to higher-level sourcing for a process) for model processes, including for consideration/analyzing of commonalities and variances at 04.

Figure 2:
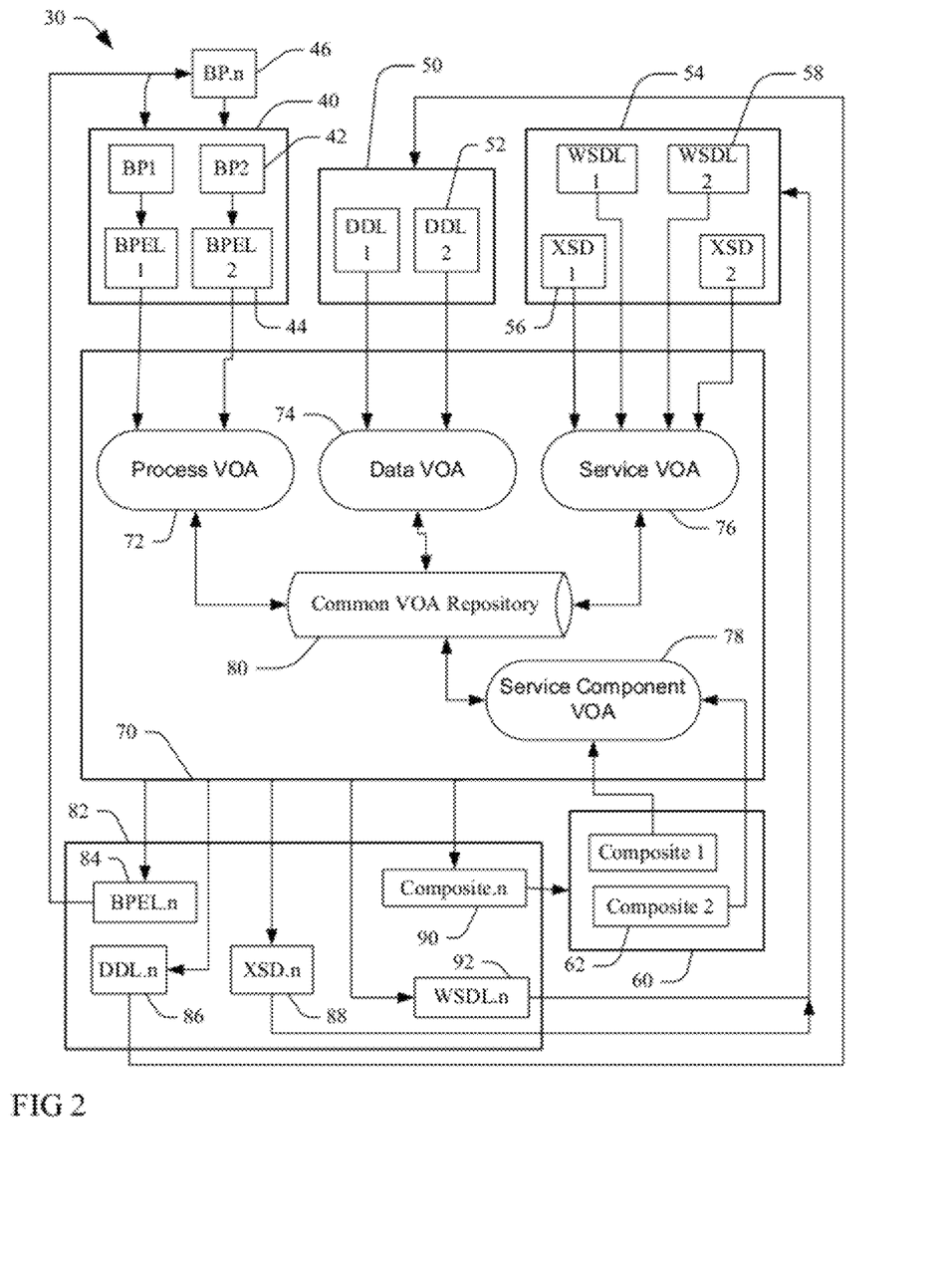
FIG. 2 provides a block diagram of an implementation of a framework for performing variation oriented analysis across aspects of SOA modeling according to the present invention.

FIG. 2 provides a block diagram of a framework 30 configured to perform variation oriented analysis across aspects of SOA modeling according to the present invention. The present embodiment provides a Variation Oriented Analysis (VOA) subsystem 70 configured to perform a pro-active VOA with respect to a plurality of different and various SOA components, namely a Business Program Model 40, a Data Model 50, a Service Model 54 and a Service Component Model 60.

More particularly, each Business Program Model 40 process 44 comprises associated tasks and meta-data transformed into a standard BPEL (Business Process Execution Language), in some cases directly implementing higher level sourcing 42 into the process 44 BPEL. A Process VOA component 72 is provided by the VOA subsystem 70 and configured to use the BPEL inputs to perform a Process VOA wherein similarities and variations are determined between the Business Program Model 40 processes 44 and stored in a Common VOA repository 80 in a common standard format; in the present example the common standard format is standard Extensible Markup Language (XML) format, though other formats may be used in other embodiments.

XML SQL data from each Data Model 50 process 52 may be used as a direct input. In some embodiments Data Definition Language (DDL) inputs from the processes 52 may also be transformed or converted into XML Structured Query Language (SQL) format by the Data VOA component 74 or other component (for example as discussed below with respect to FIG. 3). The present Data VOA component 74 thus uses XML SQL format inputs to perform Data VOA, wherein similarities and variations of the respective Data Model processes 52 are determined and stored in the Common VOA Repository 80 in the common standard XML format.

A Service VOA component 76 performs Service VOA on Standard Web Services Description Language (WSDL) format processes 58 and XML Schema Definition (XSD) format processes 56 inputs, wherein similarities and variations are determined and stored in the Common VOA Repository 80 in the standard XML format. And lastly, a Service Component VOA component 78 is also provided to perform Service Component VOA from Standard Composite (or Service Component Architecture (SCA) artifact) process inputs 62, wherein similarities and variations are determined and stored in the Common VOA Repository 80 in standard XML format.

The VOA subsystem 70 uses the commonalities and variances stored in the Repository 80 to provide process feedback, refining and decomposition functions and inputs to an SOA structure 82. More particularly, the Business Model processes BPEL 1 and BPEL 2 44 may be decomposed or refined into a resultant single SOA Business Model process BPEL.n 84. Further, the Business Model process BPEL.n 84 may also provide a feedback input the Business Model 40 for use in defining and refining the business processes 44 and higher-level sources 42 within, as well as instigate the introduction of a new high level source BP.n 46 in communication with the Business Model 40.

In a similar fashion, the Data Model processes DDL 1 and DDL 2 52 may be decomposed or refined into a resultant single SOA Data Model process DDL.n 86, which may also provide a feedback input to the Data Model 50 for use in defining and refining Data processes 52; the Service Model 54 processes XSD 1 and XSD 2 56 may be decomposed/refined into a resultant single SOA Data Model process XSD.n 88 and WSDL 1 and WSDL 2 58 decomposed/refined into a single SOA Data Model process WSDL.n 92, each also providing feedback input to the Service Model 54; and the Service Component Model 60 processes Composite 1 and Composite 2 62 may be decomposed/refined into a resultant single SOA Data Model process Composite.n 90, which may also provide a feedback input to the Composite Model 60.

Figure 3:
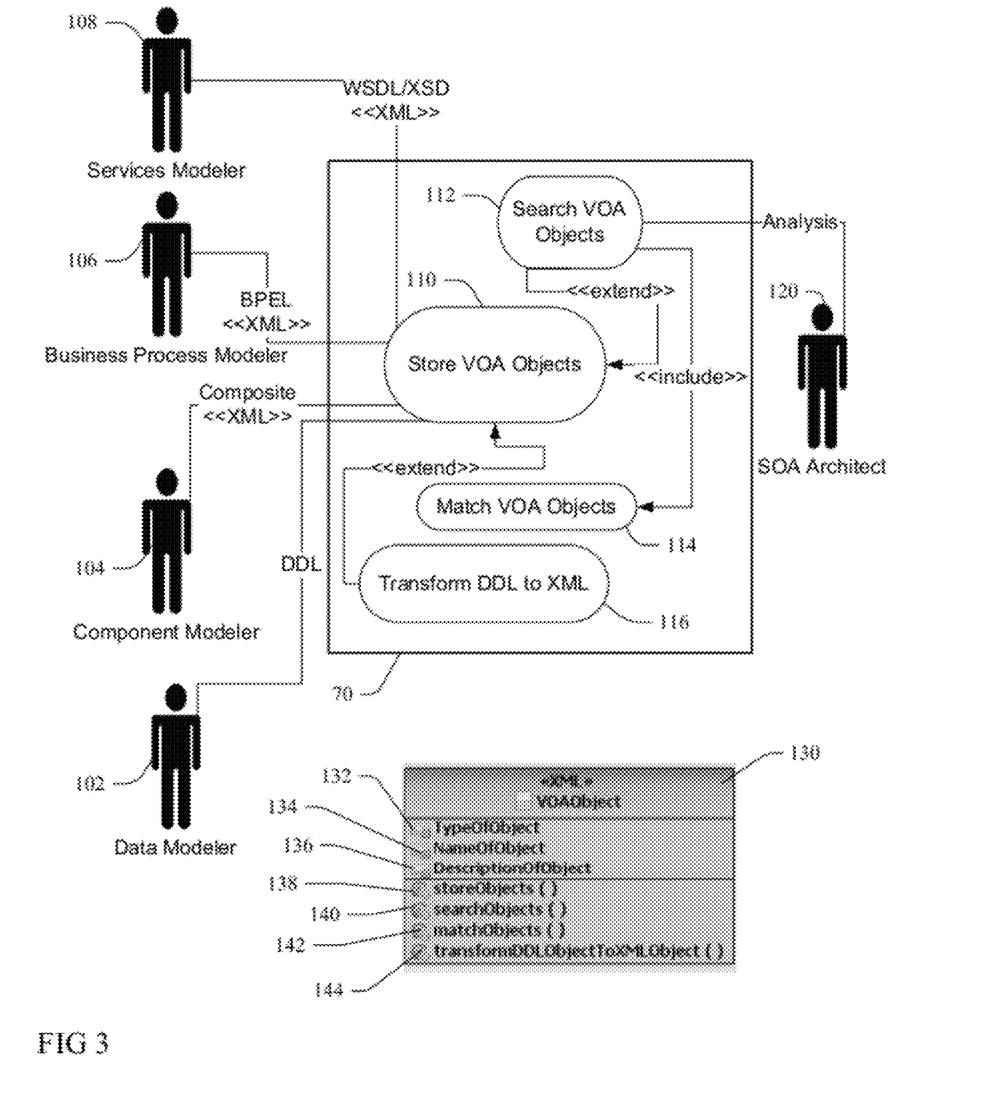
FIG. 3 is a block diagram illustration of an application the framework of FIG. 2 according to the present invention.

FIG. 3 illustrates an application of the SOA VOA framework 30 of FIG. 2, wherein the VOA analysis subsystem 70 interacts with a Business Processes Modeler 106, a Data Modeler 102, a Service Interfaces Modeler 108 and a Service Component Modeler 104 through a VOA Object Storer logic component 110. The present application provides a pro-active approach or method that not only provides a common view of all of the aspects of the various different models (e.g. of the models 40, 50, 54 and 60 of FIG. 2) but also identifies all the variations and the relationships between the various model artifacts during an analysis phase so that redundancy and re-usability are identified very early.

More particularly, artifacts are modeled and specified in respective modeling tools by the Business Processes Modeler 106, a Data Modeler 102, a Service Interfaces Modeler 108 and a Service Component Modeler 104. Prior art systems attempt to provide common view across all of these models retroactively; i.e., only hardened assets are captured. This is already too late since redundant and inflexible capabilities could already have been designed and implemented by this time. In addition, prior art techniques also tend to focus on governance aspects of the hardened assets only. In contrast, the early discovery of commonalities and variations across the related artifacts according to the present invention help in significantly minimizing the implementation of inflexible and redundant services and service components, and approaches according to the present invention may be applied not only to an SOA environment but to any development environment.

The Common VOA Repository 80 (FIG. 2) provides a consistent view across all key modeling artifacts and enables the VOA subsystem 70 to do a quick search for VOA Objects through a VOA Object Searcher logic component 112 to thereby match work-in-progress artifacts (not hardened artifacts) through use of a VOA Object Matcher logic component 114, and further to analyze and modify said artifacts as needed (e.g. to decompose or refine the Service Component Model 60 processes Composite 1 and Composite 2 62 into a resultant single SOA Data Model process Composite.n 90 as discussed above). In addition, the VOA subsystem 70 also allows discovery of patterns and facilitates architectural decisions by an SOA Architect 120 very early in an analysis phase.

Thus the VOA subsystem 70 captures commonalities and variations during modeling efforts by the respective Business Process Modeler 106, Data Modeler 102, Service Modeler 108 and Component Modeler 104, each serving inputs to the VOA subsystem 70 utilizing their respective standards as indicated in FIG. 3: DDL, WSDL/XSD)/XML Schema Description, Composite (SCA artifact)/XML, and BPEL)/XML. The present invention provides for extensible frameworks which may cover critical key components of SOA. For example, in the present example the VOA subsystem 70 employs a DDL-to-XML Aspect Format Transformer logic component 116 to transform DDL inputs from the Data Modeler 102 for the VOA Object Storer logic component 110. It will be appreciated by one skilled in the art that other Aspect Format Transformer components and processes may extend the present invention to support other aspect formats and languages (e.g. COBOL copy book, etc.), and that again embodiments may thus be extended into non-SOA environments as well.

The Common VOA Repository 80 serves as a common repository for all VOA artifacts and provides support for searching, comparing and ranking (probability of a match) VOA objects by the VOA Object Searcher 112 and VOA Object Matcher 114. Comparison of VOA artifacts by the subsystem 70 comprehends intra-model relational comparison (e.g. FIG. 2 Business processes BPEL 1 44-to-BPEL 2 44) and inter-relational (Process BPEL 1 44-to-Data DDL 1 52, Service XSD 1 56-to-Data DDL 2 52, Service Component Composite 1 62-to-Service WSD1 1 58 or Business Process PBEL 2 44, etc). Thus the SOA Architect 120 is enabled to decompose or compose VOA artifacts based on comparison and match results.

FIG. 3 also illustrates an exemplary VOA object 130 stored in the Common VOA repository 80 (FIG. 2) by the VOA Object Storer 110. As will be appreciated by one skilled in the art, the present VOA Object 130 has an object type field 132, an object name field 134 and an object description field 136. The VOA object 130 further provide a store object instance 138, a search object instance 140, a match object instance 142 and a transform instance 144, which will be understood by one skilled in the art in view of the elements of FIGS. 2 and 3 and further as described above.

The present invention thus accelerates the bridging between business process and technology which will result in business agility by performing VOA on work-in-progress artifacts. Allowing for early detection of commonalities and variations enables architectural intervention before a design, though a VOA process according to the present invention may also be conducted during a design phase as well. The present invention also enables the rapid specification of appropriate assets for decomposition to a level required or needed for a detailed design.

The present VOA subsystem 70 enables the discovery of redundant services as well as of new services needed to support business processes and their variations. Said service discovery may be done in a pro-active manner during early phases of a project and may also be applied incrementally during later stages to make any required changes and enhancements. Business process proliferation may be minimized by combining two or more redundant business processes, e.g. those which have similar tasks with a few or minor differences. However, according to the present invention process combination may also be made conditional upon performing a validity check of modeling assets any time during a decomposition process. For example, initially a discovery may indicate that two services are the same or redundant, but a VOA according to the present invention determines that these services are in fact two different non-redundant services due to different service-level agreement (SLA) requirements, data elements, etc.

By providing pro-active techniques (in contrast to the reactive techniques of existing systems), the present invention identifies all variations and the relationships between artifacts, minimizing time and effort during design and implementation phases. More particularly, early discovery of commonalities and variations across related artifacts helps in minimizing the implementation of inflexible and redundant services and service components, while enabling the handling of complexities by primarily focusing on the commonalities and variations.

Figure 4:
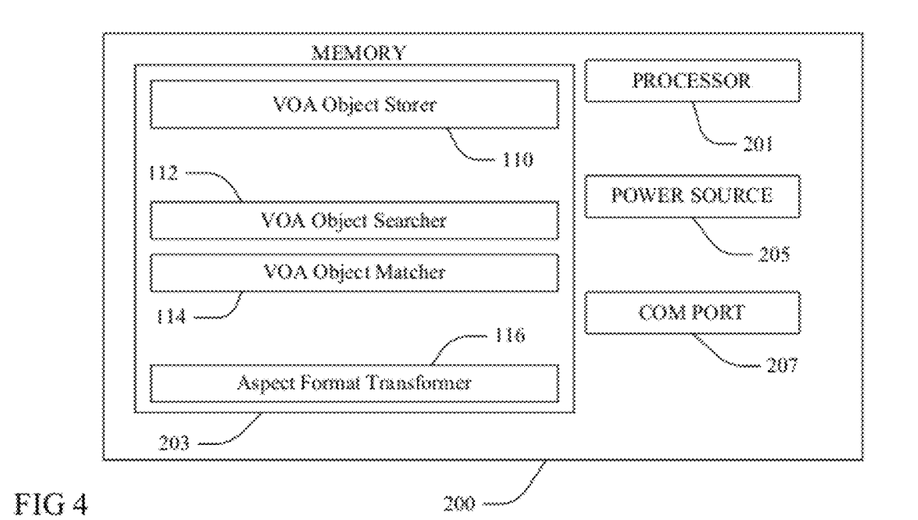
FIG. 4 is a block diagram of a system or device configured to perform a variation oriented analysis across aspects of SOA modeling according to the present invention.

FIG. 4 illustrates a programmable device or module 200 configured to performing variation oriented analysis across aspects of SOA modeling according to the present invention, for example as illustrated in FIGS. 1-3 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIGS. 1-3 as discussed above. Thus, the memory 203 comprises the VOA Object Storer logic component (e.g. algorithm, etc.) 110, the VOA Object Searcher logic component 112, the VOA Object Matcher logic component 114 and the Aspect Format Transformer logic component 116 described above. However, it will be understood that in other embodiments one or more of the components 110, 112, 114 and 116 may be omitted, and its functions or algorithms combined with others of the logic components 110, 112, 114 and 116 or accomplished by other systems, components, elements or parties A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 5:
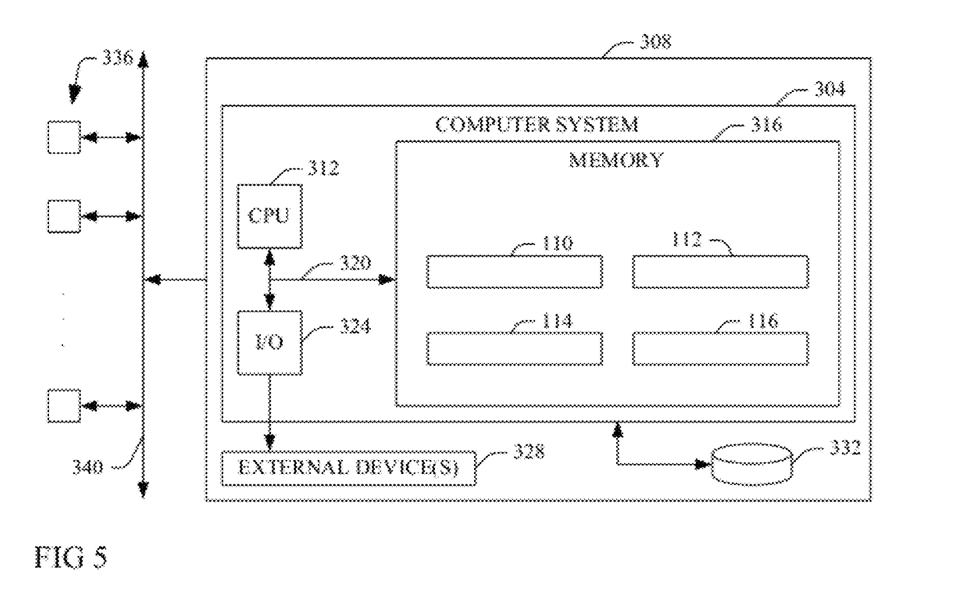
FIG. 5 is a block diagram illustrating a computerized implementation of a method and system for variation oriented analysis across aspects of SOA modeling according to the present invention.

Referring now to FIG. 5, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage media and systems 332 (which may include, for example, the Common VOA repository 80). In general, the processing unit 312 executes computer program code, such as the code to implement various components of the process and systems, and devices as illustrated in FIGS. 1-4 and described above, including the VOA Object Storer logic component 110, the VOA Object Searcher logic component 112, the VOA Object Matcher logic component 114 and the Aspect Format Transformer logic component 116 described above, and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal.

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "primary," "first" or "initial," etc., element distinguished from a "second," "third" or "another," etc., of a plurality of elements). Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for performing variation oriented analysis across aspects of service oriented architecture modeling, comprising:

capturing a commonality or a variance of a first process of an initial model plurality of processes relative to a second process of the initial model plurality, each of the first and second initial model processes having an initial model process format;

storing the initial model processes commonality or the initial model processes variance in a common repository memory device in a repository format, the repository format different from the initial model process format;

capturing at least one of a commonality or a variance of a third process of another model plurality of processes relative to a fourth process of the another model plurality, each of the third and fourth another model plurality processes having an another model process format different from the initial model process format and the repository format;

storing the commonality or the variance of the another model processes in the common repository memory device in the repository format; and refining at least two processes of the initial model plurality processes into a refined initial model plurality process as a function of at least one of the stored initial model commonality, the stored initial model variance, the stored another model commonality and the stored another model variance;

wherein the refining comprises considering any of the stored commonality and the stored variance of the initial model processes and the stored commonality and the stored variance of the another model processes.

2. The method of claim 1 wherein the initial and the another model are selected from the group consisting of a business program model, a data model, a service model and a service component model.

3. The method of claim 2, further comprising performing each of the capturing the at least one commonality or variance of the first process relative to the second process, the storing the initial model processes commonality or variance, the capturing the at least one commonality or variance of the third process relative to the fourth process, the storing the another model processes commonality or variance, and the refining the at least two processes during a service-oriented architecture analysis phase.

4. The method of claim 3, wherein the refining the at least two processes is a function of at least one of the stored initial model commonality and the stored initial model variance, and of at least one of the stored another model commonality and the stored another model variance.

5. The method of claim 3, further comprising a service provider deploying a computational device infrastructure comprising the common memory device;

wherein the computational device infrastructure is configured to perform each of the capturing the at least one commonality or variance of the first process relative to the second process, the storing the initial model processes commonality or variance, the capturing the at least one commonality or variance of the third process relative to the fourth process, the storing the another model processes commonality or variance, and the refining the at least two processes.

6. The method of claim 5, wherein the computational device infrastructure is further configured to:
rank each of the first, second, third and fourth processes for a probability of a match to an object; and
store the ranking in the common repository.

7. The method of claim 6, wherein the computational device infrastructure is configured to decompose the at least two processes as a function of a comparison result and a match result indicating that the at least two services are redundant.

8. The method of claim 7, wherein the computational device infrastructure is configured to:
perform a validity check of modeling assets of the at least two processes; and
condition the decomposing upon a result of the performed validity check.

9. The method of claim 8, wherein the computational device infrastructure is configured to stop the decomposing as a function of the performed validity check result indicating the at least two processes have different service-level agreement requirements or different data elements.

10. A method for performing variation oriented analysis across aspects of service oriented architecture modeling, comprising:
producing computer executable program code;
storing the code on a computer readable medium; and
providing the program code to be deployed and executed on a computer system, the program code comprising instructions which, when executed on the computer system, cause the computer system to:
capture a commonality or a variance of a first process of an initial model plurality of processes relative to a second process of the initial model plurality, each of the initial model processes having an initial model process format;
store the initial model processes commonality or the initial model processes variance in a common repository memory device in a repository format, the repository format different from the initial model process format;
capture at least one of a commonality or a variance of a third process of another model plurality of processes relative to a fourth process of the another model plurality, each of the another model plurality processes having an another model process format different from the initial model process format and the repository format;
store the commonality or the variance of the another model processes in the common repository memory device in the repository format; and
refine at least two processes of the initial model plurality processes into a refined initial model plurality process as a function of at least one of the stored initial model commonality, the stored initial model variance, the stored another model commonality and the stored another model variance;
wherein the computer system is configured to refine by considering any of the stored commonality and the stored variance of the initial model processes and the stored commonality and the stored variance of the another model processes.

11. The method of claim 10, the program code comprising instructions which, when executed on the computer system, causes the computer system to communicate with an initial model modeler and an another model modeler;
wherein the initial model modeler and the another model modeler are selected from the group consisting of a business program model modeler, a data model modeler, a service model modeler and a service component model modeler.

12. The method of claim 11, the program code comprising instructions which, when executed on the computer system, causes the computer system to refine the at least two processes as a function of at least one of the stored initial model commonality and the stored initial model variance, and of at least one of the stored another model commonality and the stored another model variance.

13. The method of claim 11, the program code comprising instructions which, when executed on the computer system, causes the computer system to:
rank each of the first, second, third and fourth processes for a probability of a match to an object; and
store the ranking in the common repository.

14. The method of claim 13, the program code comprising instructions which, when executed on the computer system, causes the computer system to decompose the at least two processes as a function of a comparison result and a match result indicating that the at least two services are redundant.

15. The method of claim 14, the program code comprising instructions which, when executed on the computer system, causes the computer system to:
perform a validity check of modeling assets of the at least two processes; and
condition the decomposing upon a result of the performed validity check;
wherein the condition the decomposing comprises stopping the decomposing as a function of the performed validity check result indicating the at least two processes have different service-level agreement requirements or different data elements.

16. A programmable device comprising:
a processing means;
a common repository memory device in communication with the processing means comprising a logic component; and
a network interface in communication with the processing means and the memory;
wherein the processing means is configured to:
capture at least one of a commonality and a variance of a first process input from an initial modeler in communication with the processing means relative to a second process input of the initial modeler, each of the first process input and the second process input having an initial model process format;
store the initial model processes commonality or the initial model processes variance in the common repository memory device in a repository format, the repository format different from the initial model process format;
capture at least one of a commonality and a variance of a third process input from an another modeler in communication with the processing means relative to a fourth process input from the another modeler, each of the third process input and the fourth process input having an another model process format different from the initial model process format and the repository format;
store the commonality or the variance of the another model processes in the common repository memory device in the repository format; and
refine at least two processes of the initial modeler into a refined initial modeler process as a function of at least one of the stored initial model commonality, the stored initial model variance, the stored another model commonality and the stored another model variance;

wherein the processing means is configured to refine by considering any of the stored commonality and the stored variance of the initial model processes and the stored commonality and the stored variance of the another model processes.

17. The programmable device of claim 16, wherein the initial modeler and the another modeler are selected from the group consisting of a business program model modeler, a data model modeler, a service model modeler and a service component model modeler; and wherein the processing means is further configured to capture the at least one commonality or the variance of the first process relative to the second process, store the initial modeler processes commonality or the variance, capture the at least one commonality or the variance of the third process relative to the fourth process, store the another model processes commonality or the variance, or refine the at least two processes in response to a service-oriented architecture architect input during a service-oriented architecture analysis phase.

18. The programmable device of claim 17, wherein the processing means is further configured to refine the at least two processes as a function of at least one of the stored initial model commonality and the stored initial model variance, and of at least one of the stored another model commonality and the stored another model variance.

19. The programmable device of claim 17, wherein the processing means is further configured to:

rank each of the first, second, third and fourth processes for a probability of a match to an object;

store the ranking in the common repository; and decompose the at least two processes as a function of a comparison result and a match result indicating that the at least two services are redundant.

20. The programmable device of claim 19, wherein the processing means is further configured to:

perform a validity check of modeling assets of the at least two processes; and condition the decomposing upon a result of the performed validity check;

wherein the condition the decomposing comprises stopping the decomposing as a function of the performed validity check result indicating the at least two processes have different service-level agreement requirements or different data elements.

* * * * *